J. A. REYNOLDS.
EGG CASE.
APPLICATION FILED MAY 8, 1913.
1,126,274.
Patented Jan. 26, 1915.
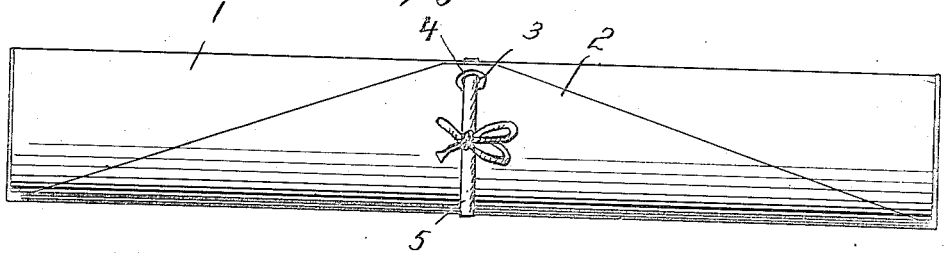
Fig. 1
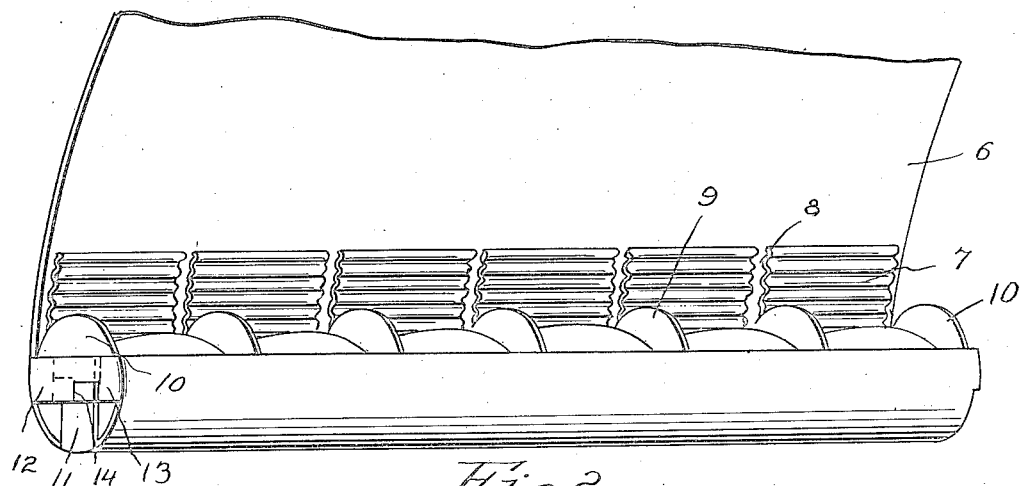
Fig. 2
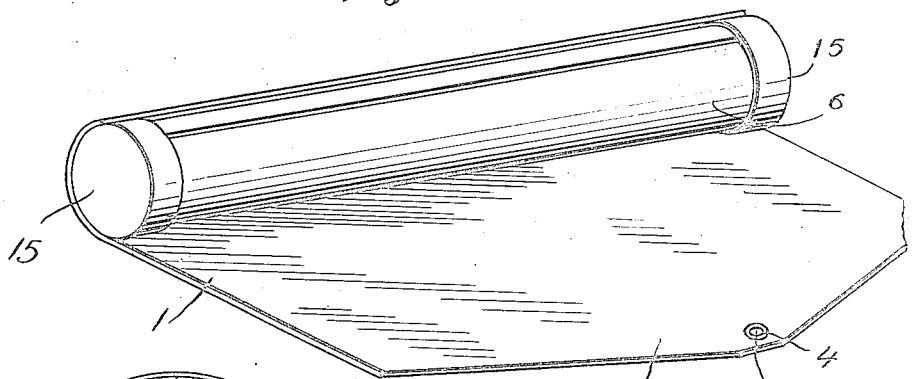
Fig. 3
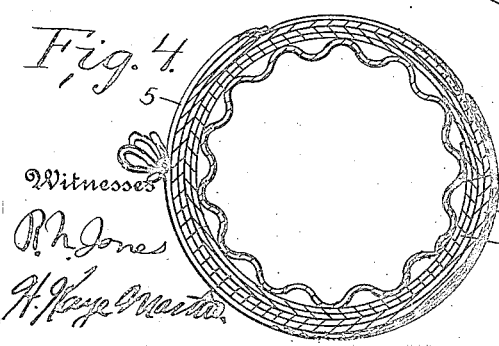
Fig. 4
Witnesses
P. N. Jones
H. Kaye Marten
Inventor
J. A. Reynolds.
By 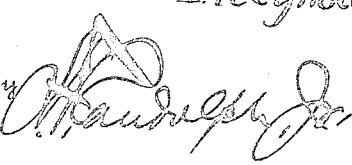
Attorney.

UNITED STATES PATENT OFFICE.

JOHN A. REYNOLDS, OF SIGOURNEY, IOWA.

EGG-CASE.

1,126,274.　　　Specification of Letters Patent.　　Patented Jan. 26, 1915.

Application filed May 8, 1913. Serial No. 766,363.

*To all whom it may concern:*

Be it known that I, JOHN A. REYNOLDS, a citizen of the United States, residing at Sigourney, in the county of Keokuk and State of Iowa, have invented certain new and useful Improvements in Egg-Cases; and I do hereby declare the following to be a full, clear, and exact description of the invention, such as will enable others skilled in the art to which it appertains to make and use the same.

This invention relates to new and useful improvements in egg cases and has for its object to provide a device in which eggs may be mailed without danger of becoming crushed or broken during shipment.

Another object of the invention is to provide means whereby the case when packed will form a compact bundle and occupy only the amount of space required for an ordinary mailing tube.

A still further object of the invention is to provide a device in which the eggs may be packed from time to time and may be used for several different shipments.

A still further object of the invention is to provide a water-proof casing which will prevent moisture from soaking into the material and causing the same to become soft, which would endanger the contents.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a view in elevation, of the improved egg case as it would appear when rolled and ready for shipment, Fig. 2 is a perspective view of the improved egg case, partly open, showing the eggs in place, Fig. 3 is a perspective view of my improved egg case as it would appear when rolled and with the outer wrapper in position to be applied, and, Fig. 4 is a transverse sectional view of the improved egg case.

Referring to the drawings by characters of reference, 1 indicates the outer wrapper of my improved egg case having formed at one end thereof the tongue 2. This tongue 2 tapers upwardly, as clearly illustrated, and is provided intermediate its lateral extremities with an aperture 3 through which an eyelet 4 is clamped and which protects the edges of the aperture and prevents the same from being torn. A flexible member 5, preferably of ribbon or tape, is secured to the outer casing and is adapted to be clasped around the same and to be tied, thereby holding said casing in its rolled position.

The inner casing of the improved egg case preferably comprises a body portion 6 having secured thereto adjacent one extremity, the corrugated packing paper 7, which is preferably treated with paraffin or similar wax, to render the same waterproof. This corrugated paper is provided at spaced intervals with grooves 8 which grooves are adapted to receive the edges of the partition disks 9, as clearly illustrated in Fig. 2. It will be apparent that the disks 9 while serving the purpose of partitions in the egg case for the separation of the eggs, will also serve to strengthen the outer casing of said case and minimize the danger of pressure. The end disks 10 are secured intermediate the outer extremities of the end pieces of the packing material and the flaps 11, 12 and 13, the flaps 12 and 13 being preferably slitted, as clearly illustrated in Fig. 2 and adapted to be hooked together as indicated at 14. When the flaps 12 and 13 are in engagement with the end partitions the flap 11 is held firmly against the end partition of the egg case and said partition will be held in place thereby. Furthermore the flaps when in a locked position will hold the case in the general position illustrated in Fig. 2 at which time it will be apparent that the same may be filled without causing any inconvenience to the user. After the eggs are placed in the inner case and the same rolled, the end caps 15 are put in place and the end of the body portion 6 opposite the packing 7, is secured beneath the flanges of the cap and held thereby.

When it is desired to pack eggs for shipment the same are placed in the inner wrapper and the inner wrapper rolled, as clearly illustrated. The caps 15 are then put in position and the whole device placed in the outer wrapper which is then rolled and the ribbon or tape 5 tied, thereby forming a secure wrapper which will comply with all the requirements of the parcel post laws relative to the shipment of eggs by mail.

It is to be understood that while I have shown and described. the preferred embodiment of my invention, I do not wish to be limited to this exact construction, combination, and arrangement of parts, but may make such changes as will fall within the spirit and scope of the invention.

Having thus described my invention, what I claim is:—

An egg case comprising a rectangular sheet of flexible material, a transverse row of rectangular cushions secured to the rectangular sheet and extending inwardly from one end thereof, said cushions terminating short of the other end and arranged in spaced relation, the end cushions being spaced inwardly from the lateral edges of the sheet, interlocking tongues at the lateral edges of the sheet and holding a portion thereof and the cushions in semi-cylindrical formation, circular partition walls arranged to extend between the cushions to prevent the device from collapsing, and a cover flap formed by the sheet of flexible material between the ends of the cushions and the end of the sheet, said cover flap being arranged to close and envelop the whole.

In testimony whereof I affix my signature in presence of two witnesses.

JOHN A. REYNOLDS.

Witnesses:
  H. L. SCHILLING,
  W. W. ELLIOTT.